Dec. 11, 1951     C. J. STALEGO     2,578,100
METHOD AND APPARATUS FOR FORMING FIBERS
Filed March 18, 1946     2 SHEETS—SHEET 2
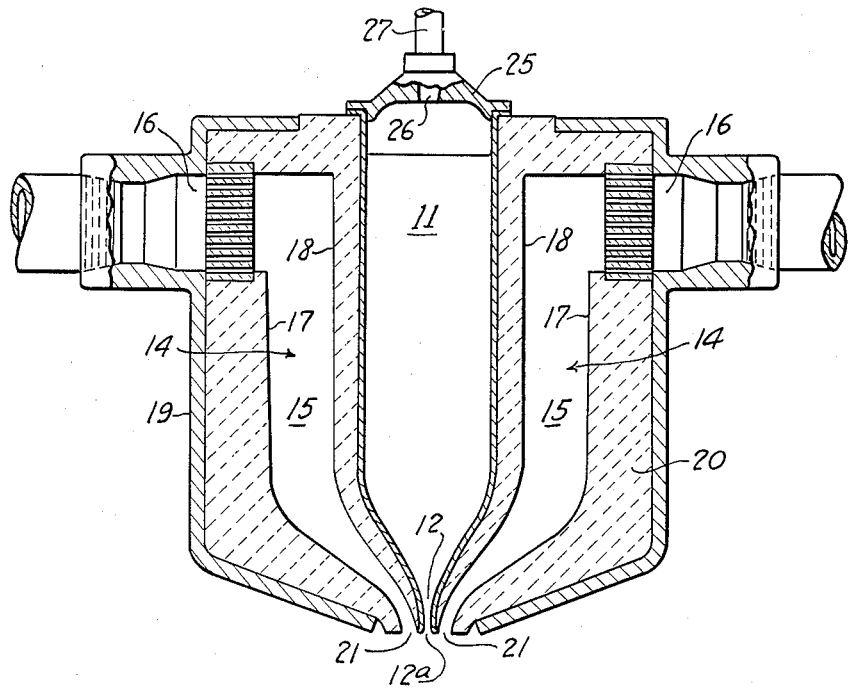
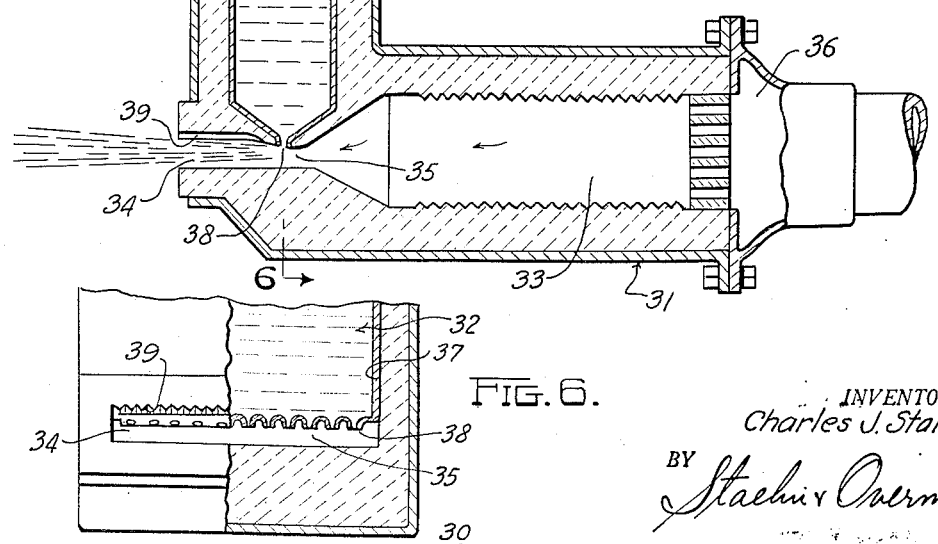
INVENTOR.
Charles J. Stalego
BY
Staehli & Overman
ATTORNEYS Patented Dec. 11, 1951

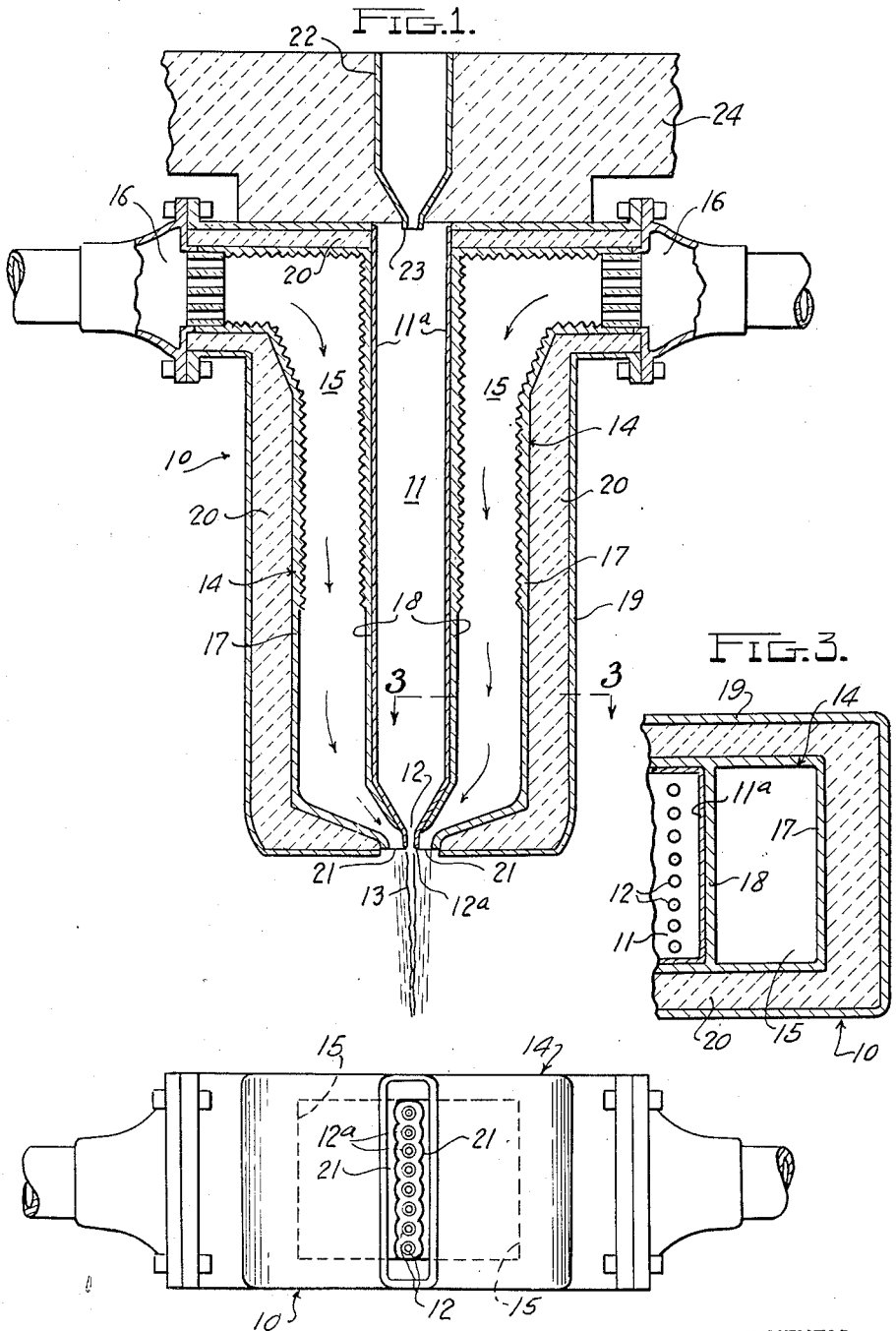

2,578,100

UNITED STATES PATENT OFFICE 2,578,100

METHOD AND APPARATUS FOR FORMING FIBERS

Charles J. Stalego, Newark, Ohio, assignor to Owens-Corning Fiberglas Corporation, a corporation of Delaware Application March 18, 1946, Serial No. 655,270

7 Claims. (Cl. 49—17)

The present invention relates to an improved method and apparatus for forming fibers from thermoplastic materials such as, for instance, glass and more particularly to a compact apparatus of small size for economically forming glass fibers.

Heretofore, glass fibers have been formed by flowing streams of molten glass from a supply body thereof and engaging the streams with a gaseous blast by which the streams are attenuated to fibers. This process when used commercially not only requires a large melting area for the glass but entails the use of much piping for supplying high pressure steam to the blowers and in addition requires electrical equipment for controlling and maintaining proper temperature of the glass. The use of steam or other gaseous medium has a cooling effect on the attenuated fibers which at times is undesirable.

It has been found that much of the apparatus mentioned above can be eliminated and thus provide a fiber forming unit of relatively small size which can be arranged in multiple within a limited space to produce any desired volume of fibers. By employing a high temperature gaseous blast in proximity to the glass the glass can be melted to flowable temperature and streams thereof attenuated by the escape of the high velocity products of combustion.

It is the primary object of the present invention to provide a fiber forming method and apparatus embodying in a sigle unit a supply body of molten glass which is melted and attenuated by a single source of heat and force, thereby eliminating apparatus heretofore employed.

Another object of this invention is to so arrange the feeder and burner for producing the blast that the products of combustion not only serve to attenuate the streams issuing from the feeder into fine fibers, but in addition, serves to melt or maintain the glass in the feeder to the proper viscosity for efficient fiber forming. More particularly, the invention provides for arranging the feeder and high velocity burner so that one wall of the feeder also forms a wall of the combustion chamber of the burner. As a result, the feeder is in direct heat-conducting relation to the flame in the combustion chamber of the burner and sufficient heat is thereby applied to the contents of the feeder to melt the same.

Still another object of this invention is to support a pair of high velocity burners at opposite sides of the feeder in such a manner that the adjacent walls of the burners form the opposite walls of the feeder.

A further object of this invention is to provide an arrangement of the type set forth in the preceding paragraph wherein the outlet openings for the burners are respectively positioned at opposite sides of the streams of molten material issuing from the feeder and wherein these openings discharge the products of combustion at a velocity sufficient to attenuate the streams into fine fibers.

A still further object of this invention is to direct the streams of molten material from the feeder into a Venturi burner discharge passage in such relationship to the venturi to enable the high velocity blast flowing through the venturi to attenuate the glass into extremely fine fibers.

The foregoing as well as other objects will be made more apparent as this description proceeds, especially when considered in connection with the accompanying drawings, wherein:

Figure 1 is a vertical sectional view through fiber forming equipment embodying the features of this invention;

Figure 2 is a bottom plan view of the construction shown in Figure 1;

Figure 3 is a fragmentary sectional view taken on line 3—3 of Figure 1.

Figure 4 is a vertical sectional view through a modified form of construction;

Figure 5 is a vertical sectional view through still another modification of the present invention, and Figure 6 is a partial front elevational view of the form of invention shown in Figure 5 with parts being shown in section as indicated by the line 6—6 of Figure 5.

Referring first to the embodiment of the invention shown in Figures 1 to 3, it will be noted that the reference characters 10 indicates fiber forming apparatus embodying a vertically extending elongated melting chamber 11 adapted to contain a supply of molten thermoplastic material such, for example, as glass. The lower end of the chamber 11 is formed with a plurality of restricted discharge orifices 12 formed in depending tips 12a or nipples through which molten glass flows in the form of streams 13. The walls 11a of the chamber are formed of a material capable of withstanding extremely high temperatures over long periods of use. Particularly satisfactory results have been obtained by forming the walls of the chamber of platinum, although in some cases, molybdenum or other high temperature resistant materials may be used.

Positioned at each side of the chamber 11 is a burner 14 and each burner comprises a combustion chamber 15. The combustion chambers respectively extend for substantially the full area of the opposite side walls of the chamber 11 and are formed with intake parts 16 at the upper ends through which a combustible gaseous mixture is introduced into the combustion chambers. The outer walls 17 of the combustion chambers are formed of a suitable refractory material and the inner walls 18 are formed of a similar material. The inner walls 18 of the combustion chambers form a heat resistant covering for the metal walls of the glass chamber 11 and protect the latter walls from direct contact with the flames produced by the burners. However, the refractory walls 18 embrace the metal walls of the glass chamber 11 and may be considered as part of the latter. In any case, the walls 18 are in direct heat conducting relationship with the metal walls of the glass chamber 11, so that the heat generated in the combustion chambers may be transferred directly to the glass in the chamber 11. The refractory walls 17 of the combustion chambers are supported in a metal casing 19 and are insulated from the casing by a suitable heat resisting refractory 20.

In general, the selected combustible gaseous mixture is introduced into the upper ends of the combustion chambers 15 through the intake ports 16 and, as this mixture burns in the chambers 15, the walls of the latter are heated to extremely high temperatures. As a result, the rate of burning of the gaseous mixture entering the combustion chambers is substantially increased and a high expansion of the products of combustion is thereby obtained. The products of combustion are discharged from each chamber 15 through an outlet port 21, which is restricted to such an extent as to greatly accelerate discharge of the products of combustion and provide a very high velocity blast of intense heat.

Upon reference to Figure 1 of the drawings, it will be noted that the discharge openings 21 are respectively positioned at opposite sides of the outlet orifices 12, so that the blasts of the products of combustion envelope the tips 12a. The blasts converge from opposite sides of the streams of glass 13 issuing from the orifices 12 and are directed in the same general direction as the flow of the streams 13. The velocity of the blast is so great that the streams issuing from the orifices 12 are attenuated thereby to extremely fine fibers.

Owing to the fact that the combustible gaseous mixture is burned in direct heat conducting relation to opposite side walls of the glass chamber 11 throughout the area of these walls, it is possible to melt glass marbles or other glass making materials directly in the chamber 11. This arrangement is advantageous for some applications, because it enables eliminating the usual glass feeder or bushing as well as the conventional primary filament attenuating mechanism. However, in cases where the glass is melted in the chamber 11, it is usually necessary to provide the chamber with sufficient length to secure the time interval necessary to melt the glass to the proper viscosity. In instances where it is desired to employ apparatus with a relatively short chamber, molten glass may be introduced into the upper end of the chamber by a feeder 22 supported above the fiber forming equipment 10. In the present instance, the feeder is diagrammatically shown in Figure 1 as comprising a conventional type of glass furnace having an outlet 23 registering with the upper end of the chamber 11, so that molten glass from the furnace flows directly into the chamber. Insulation 24 surrounding the feeder extends between the bottom of the feeder 22 and the top of the fiber forming equipment 10 in order to prevent air from entering the chamber 11.

Figure 4 illustrates fiber forming equipment similar in construction and operation to the equipment previously described in connection with Figures 1 and 2 of the drawings. Corresponding parts of the two embodiments are indicated by the same reference characters. The fiber forming equipment shown in Figure 4 differs from the equipment previously described in that provision is made for applying pressure to the molten glass in the chamber 11 and thereby facilitate feeding of the streams 13 through the orifices 12. The above may be accomplished by closing the upper end of the chamber 11 with a cap 25 having an opening 26 therethrough for connection to a conduit 27. The conduit 27 is connected to a source of fluid medium under pressure and a pressure regulator (not shown) may be provided in the conduit to enable maintaining pressures in the chamber 11 which are equal to or slightly greater than the pressures developed in the burner combustion chambers. This arrangement assures free flow of molten glass through the orifices regardless of any back pressure that may be applied by the products of combustion discharging from the burners 14.

Figures 5 and 6 of the drawings illustrate a modified form of fiber forming apparatus indicated generally by the reference character 30 and comprising a high velocity combustion chamber type burner 31 in combination with a receptacle 32 or chamber for molten glass. The burner includes a combustion chamber 33 provided with a substantially horizontally disposed, restricted discharge passage 34 formed with a throat or venturi 35. A fuel gas inlet 36 is provided at the opposite end of the chamber 33. The chamber 32 adapted to contain a supply of molten glass is positioned adjacent the venturi in vertical relation to the passage 34. The chamber 32 may well include a metal walled liner 37, provided with a plurality of orifices 38 at the bottom thereof through which molten glass flows directly into the restricted throat of the discharge passage where the velocity of the blast is highest.

The design of the venturi 35 is predetermined to discharge the products of combustion from the burner combustion chamber 33 at an extremely high velocity. Thus, by introducing the molten glass into the Venturi passage, the molten glass is not only blown by the blast into fine glass fibers, but the velocity of the blast creates a suction at the delivery ends of the orifices 38 sufficient to assist the hydrostatic pressure exerted on the molten glass in the chamber to discharge the molten glass into the Venturi passage. The action of the blast flowing across the orifices 38 may be enhanced to some extent by locating the orifices slightly beyond the maximum restriction of the venturi, as clearly shown in Figure 5 of the drawings. It is further pointed out that at least a portion of one wall of the glass chamber 32 forms a part of the combustion chamber, so that the heat generated in the combustion chamber serves to heat the molten glass in the chamber 32 and maintain the glass at the optimum viscosity for fiber formation.

As shown in Figure 6 the upper surface of the discharge passage 34 is provided with serrations 39 which not only increase the incandescent surface area of the passage but provide points from which any unfiberized glass may be attenuated. Normally the fine streams of glass issuing from the orifices 38 are immediately formed into fibers but there may be times when small particles of glass are drawn into contact with the upper surface of the passage due to the turbulent action of the blast after it leaves the throat 35.

I claim:

1. Apparatus for producing glass fibers, comprising a vertically disposed melting chamber adapted to contain a supply of molten glass and having a plurality of orifices through which molten glass flows in the form of streams, means for introducing fluid under pressure into the chamber to assist the flow of molten glass through the orifices, vertically disposed combustion chambers arranged to burn a combustible gaseous mixture in heat conducting relation to the melting chamber, and discharge openings for the products of combustion positioned adjacent the orifices and in substantially the same horizontal plane to direct the products of combustion out of the combustion chambers in parallelism with the flow of the glass streams issuing from the orifices and restricted to provide blasts of sufficient velocity to attenuate the streams to form fine fibers.

2. Apparatus for producing glass fibers, comprising an elongated vertically extending chamber adapted to contain a supply of glass, glass discharge orifices in the bottom wall of the chamber spaced from each other in a row extending in the direction of the width of the chamber and through which molten glass flows in the form of streams, means for burning a combustible mixture of gases in heat conducting relationship to the opposite side walls of the chamber including combustion chambers extending vertically along opposite side walls of the glass supply chamber, slots in the bottom walls of the combustion chambers extending along opposite sides of the row of discharge orifices and restricted to discharge the products of combustion from the chambers in the form of blasts moving at sufficient velocity to attenuate the streams of glass flowing from the orifices to form fibers, said slots and glass discharge orifices being disposed substantially in the same horizontal plane.

3. Apparatus for producing glass fibers comprising an elongated vertically extending substantially rectangular in cross-section chamber adapted to contain a supply of glass, discharge orifices in the bottom wall of the chamber spaced from each other in a row extending in the direction of width of the chamber and through which molten glass flows in the form of individual streams, vertically extending combustion chambers positioned in parallel relation at opposite sides of the glass supply chamber with the inner walls in direct heat conducting relationship to the glass supply chamber for substantially the full width of the opposite sides thereof and within which a combustible mixture of gases is burned at high temperature, the walls of the glass chamber connecting the opposite sides of the latter being relatively narrow so that the major area of the glass chamber walls are heated by the burning gases within the combustion chambers, and slots in the bottom walls of the combustion chambers extending along opposite sides of and in substantially the same horizontal plane with the row of glass discharge orifices; said slots being shaped and restricted to discharge the products of combustion from the combustion chambers in the form of blasts completely surrounding the individual glass streams and moving at sufficient velocity to attenuate the molten glass streams issuing from the orifices to form fibers.

4. Apparatus for producing glass fibers comprising an elongated vertically extending substantially rectangular in cross-section chamber adapted to contain a supply of glass and having means in the bottom wall for discharging molten glass, said chamber having metal walls, vertically extending combustion chambers positioned at opposite sides of the glass supply chamber and formed with relatively thin inner walls of refractory material in direct contact and heat conducting relationship with the metal walls of the glass supply chamber for substantially the full width of the opposite sides of the latter chamber and within which combustible mixtures of gases are burned at a high temperature, the walls of the glass supply chamber connecting the opposite sides thereof being relatively narrow so that the major area of the glass supply chamber walls are heated by the burning gases within the combustion chambers, and slots in the bottom walls of the combustion chambers extending along opposite sides of the glass discharge means for attenuating the molten glass to form fibers.

5. Apparatus for producing glass fibers comprising an elongated vertically extending chamber adapted to contain a supply of glass, glass discharge orifices in the bottom wall of the chamber spaced from each other in a row extending in the direction of the width of the chamber and through which molten glass flows in the form of streams, means for burning a combustible mixture of gases in heat conducting relationship to the opposite side walls of the chamber including a pair of combustion chambers extending vertically along opposite side walls of the glass supply chamber, said glass chamber walls being formed of metal surrounded by a relatively thin layer of refractory material, said refractory material forming wall portions of the combustion chambers, slots in the bottom walls of the combustion chambers extending along opposite sides of the row of discharge orifices, said slots being shaped and restricted to discharge the products of combustion from the chambers in the form of blasts completely surrounding each individual glass stream and moving at sufficient velocity to attenuate the streams of glass flowing from the orifices to form fibers.

6. The process of producing glass fibers which comprises melting glass forming material within a vertically extending elongated chamber by burning a combustible mixture of gases in heat conducting relationship to the chamber, flowing the molten glass through spaced orifices from the bottom of the chamber in the form of a row of individual streams, confining the combustible mixture of gases during the burning operation to substantially increase the rate of burning and the temperature of the gases, discharging the products of combustion through outlets in a horizontal plane with the orifices in the form of blasts against opposite sides of the glass streams as the latter issue from the supply chamber and in the general direction of flow of the streams, and attenuating the individual streams to form fibers.

7. The process of producing glass fibers which includes melting glass within a receptacle by burning combustible mixtures in dual chambers arranged in heat conducting relationship to the glass-containing receptacle, flowing the molten glass from the receptacle through orifices in the form of spaced individual streams, confining the combustible mixtures in the chambers during combustion to substantially increase the speed of combustion and temperature of the gases, discharging the products of combustion through outlets disposed in a transverse plane through the orifices in the form of dual blasts on opposite sides of the glass streams in substantial parallelism therewith as the latter issue from the receptacle to completely encompass and attenuate the individual streams to form fibers.

CHARLES J. STALEGO.

REFERENCES CITED

The following references are of record in the file of this patent:

UNITED STATES PATENTS

| Number | Name | Date |
|---|---|---|
| 1,008,204 | Seghers | Nov. 7, 1911 |
| 1,328,446 | Odam | Jan. 20, 1920 |
| 2,206,058 | Slayter et al. | July 2, 1940 |
| 2,229,489 | Barnard | Jan. 21, 1941 |
| 2,455,908 | Slayter | Dec. 7, 1948 |
| 2,489,242 | Slayter et al. | Nov. 22, 1949 |
| 2,495,956 | Cook | Jan. 31, 1950 |